Nov. 1, 1955        N. F. NICKLES        2,722,447
COMBINATION BUMPER GRILLE
Filed Jan. 4, 1950                     4 Sheets-Sheet 1
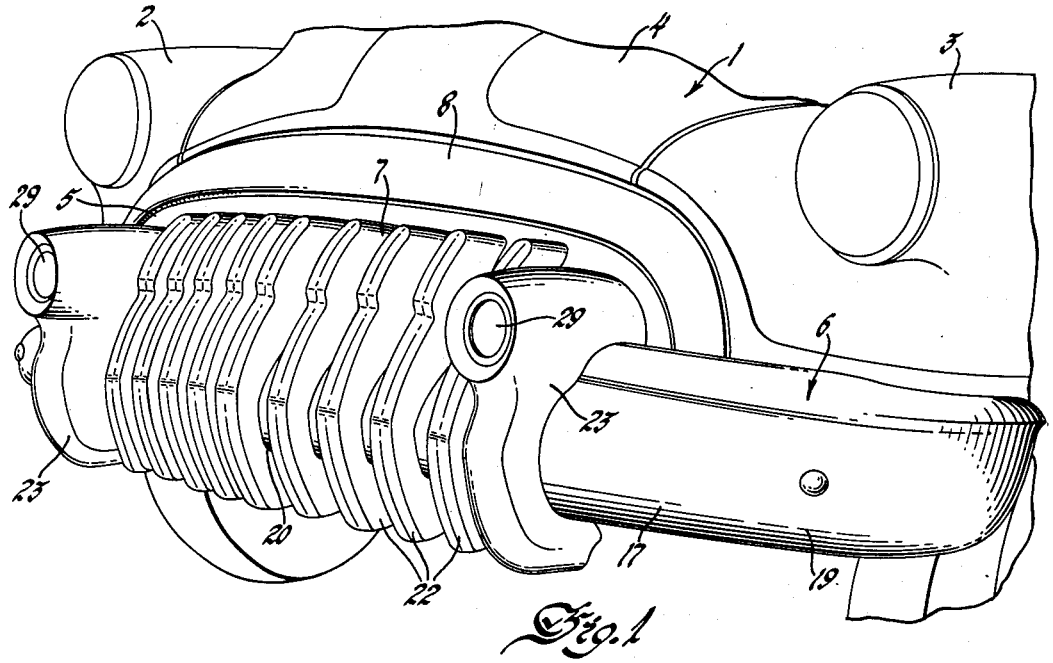
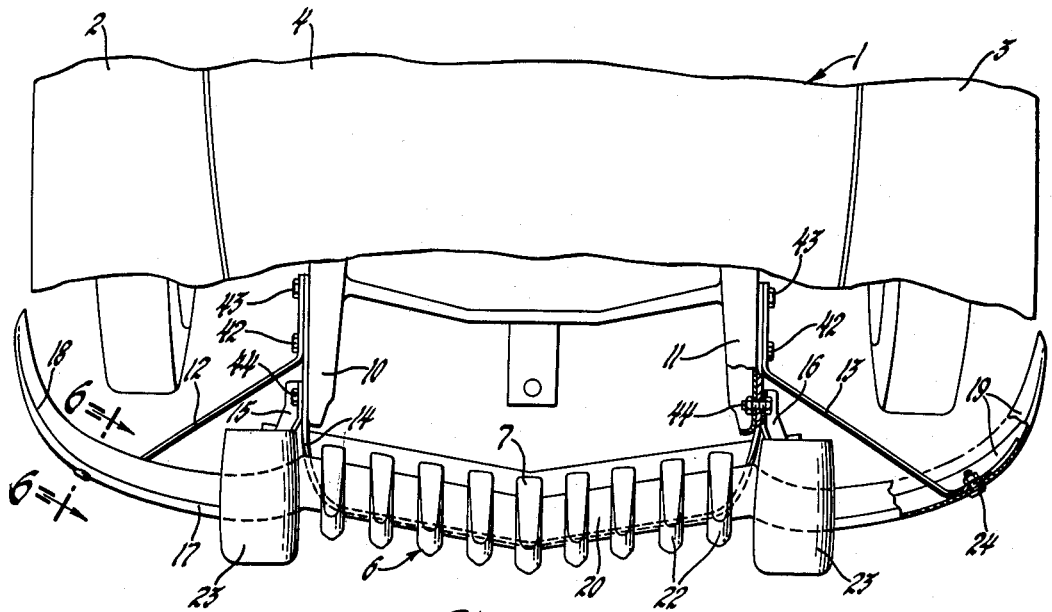
Inventor
Ned F. Nickles
By
Willits, Helwig & Baillio
Attorney

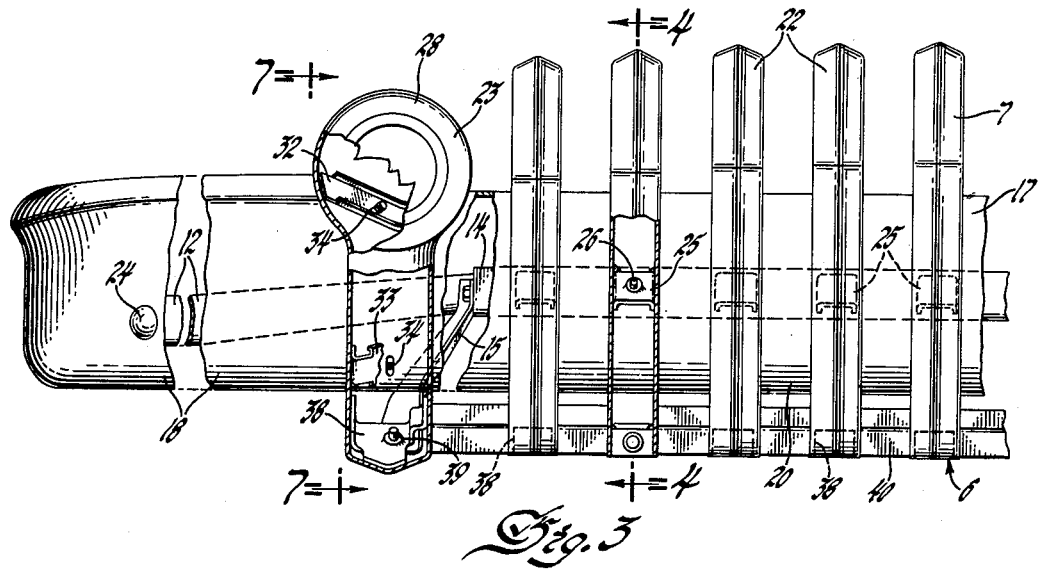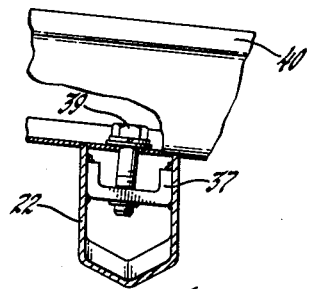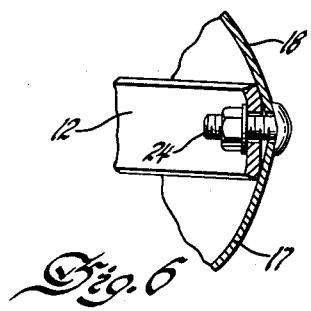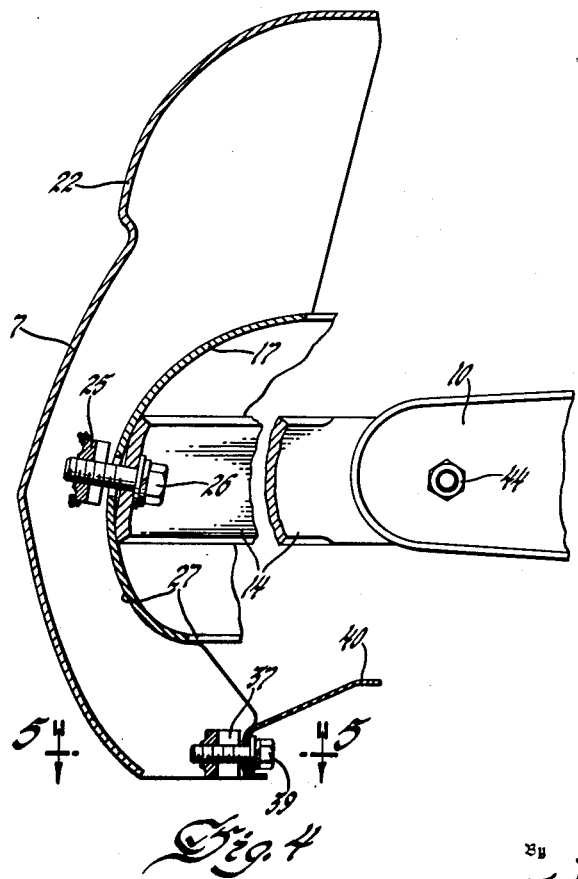

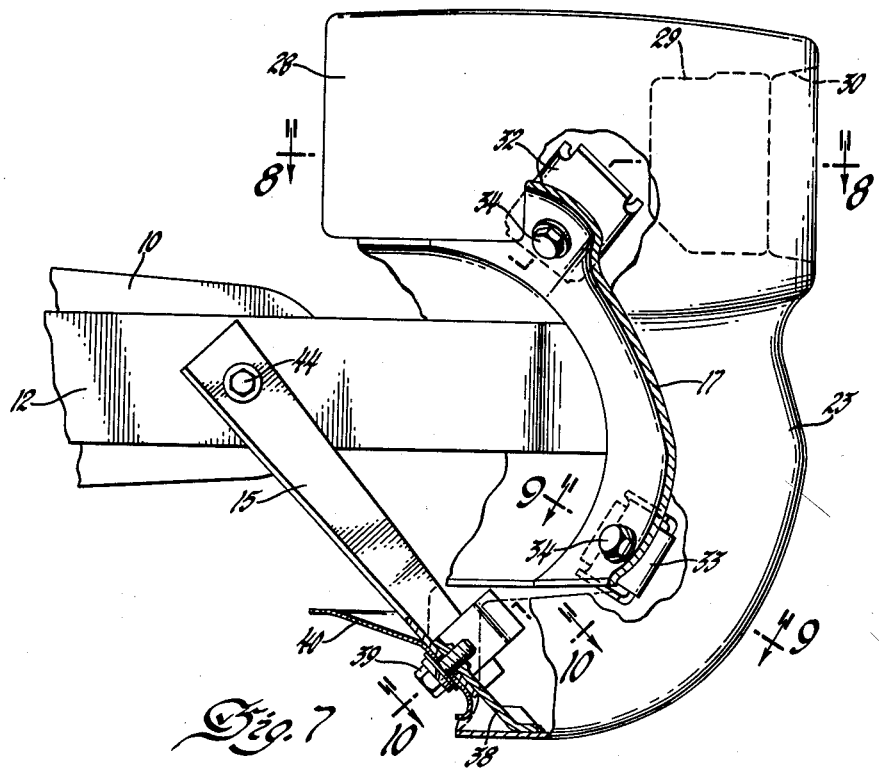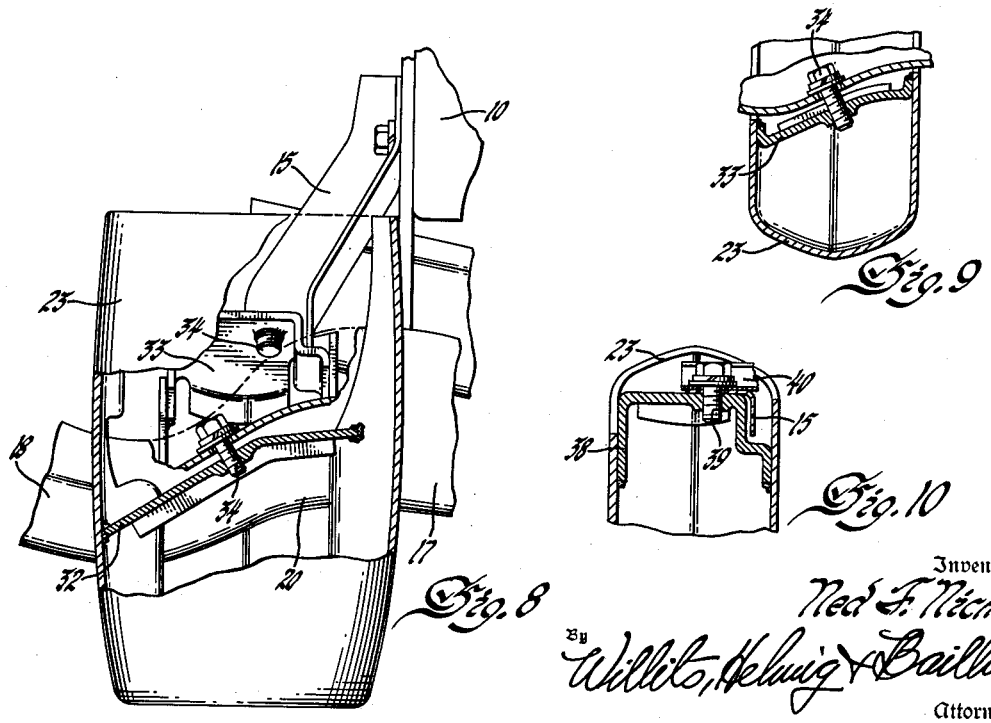

Nov. 1, 1955 N. F. NICKLES 2,722,447
COMBINATION BUMPER GRILLE
Filed Jan. 4, 1950 4 Sheets-Sheet 4

Inventor
Ned F. Nickles
By
Willito, Helwig & Baillio
Attorney.

United States Patent Office 2,722,447
Patented Nov. 1, 1955

2,722,447

COMBINATION BUMPER GRILLE

Ned F. Nickles, Detroit, Mich., assignor to General Motors Corporation, Detroit, Mich., a corporation of Delaware Application January 4, 1950, Serial No. 136,729

6 Claims. (Cl. 293—63)

This invention relates to motor vehicles and particularly to an end construction therefor comprising a combined bumper and air intake grille.

The conventional practice prior to my invention, particularly on automobiles having a forwardly mounted engine receiving its cooling air supply through an opening in the forward wall in the body sheet metal, has been to provide a grille structure for the air intake opening fixedly secured to the body sheet metal and a transverse bumper separately supported on relatively long resilient arms from the vehicle frame in a position forwardly of the grille. By reason of the bumper being mounted separately from the grille its movement relative thereto on the occasions of vehicle collisions frequently results in the bumper coming in contact with and damaging the grille.

Further in an attempt to insure against projecting portions of other vehicles, et cetera extending over or under the bumper and striking the grille on the occasions of minor collisions, various extensions or "bumper guards" have been attached to the bumper bar to provide the same with a widened section opposite the grille. It frequently happens, however, that upon one of these bumper guards receiving a substantial blow the bumper bar and its supporting structure twists sufficiently for the guard itself to strike the grille, thereby causing damage which would not have occurred in the absence of such bumper guards.

While attempts have been made in the prior art to avoid these difficulties by making the grille of regular bumper stock and arranging it to be carried by the bumper so as to move with it in the event of collision, the results have been unsatisfactory either by reason of the excessive cost of the construction employed and/or the added weight on the bumper resulting in excessive vibration forces at the forward end of the vehicle during operation.

It is, therefore, the principal object of the instant invention to provide an improved end construction for an automotive vehicle incorporating a combined grille and bumper which eliminates the objections aforementioned. A more specific object of the invention is to provide such a vehicle end construction incorporating a single primary bumper bar carrying a series of individually distinct and separably attached secondary bars in laterally spaced relation opposite the air intake opening to form a grille therefor.

Another object of the invention is to provide such an improved bumper-grille structure having improved means for suspending the structure from the vehicle frame effective to prevent its objectionable vibration during vehicle operation.

A still further object of the invention is to provide a bumper-grille structure employing a single transverse primary impact member carrying a series of generally vertical secondary bars in laterally spaced apart relation thereon, the outermost secondary members serving additionally as headlight lamp enclosures.

These and other objects attained by my invention will be clearly understood from the following description having reference to the drawings, wherein:

Figure 1 is a perspective view of the front end of a conventional automotive vehicle incorporating a combined bumper and grille construction in accordance with my invention.

Figure 2 is a plan view of the front portion of the vehicle shown in Figure 1, with parts broken away and in section.

Figure 3 is an enlarged front elevational view of the left-hand portion of the bumper-grille structure shown in Figure 2, with portions broken away and in section.

Figure 4 is a further enlarged sectional view taken substantially on line 4—4 of Figure 3.

Figure 5 is a detailed sectional view taken substantially on line 5—5 of Figure 4.

Figure 6 is an enlarged detailed sectional view taken substantially on line 6—6 of Figure 2.

Figure 7 is an enlarged elevational view taken from line 7—7 of Figure 3, with portions broken away and in section.

Figures 8, 9 and 10 are detailed sectional views taken substantially on lines 8—8, 9—9 and 10—10, respectively, of Figure 7.

Figure 11:
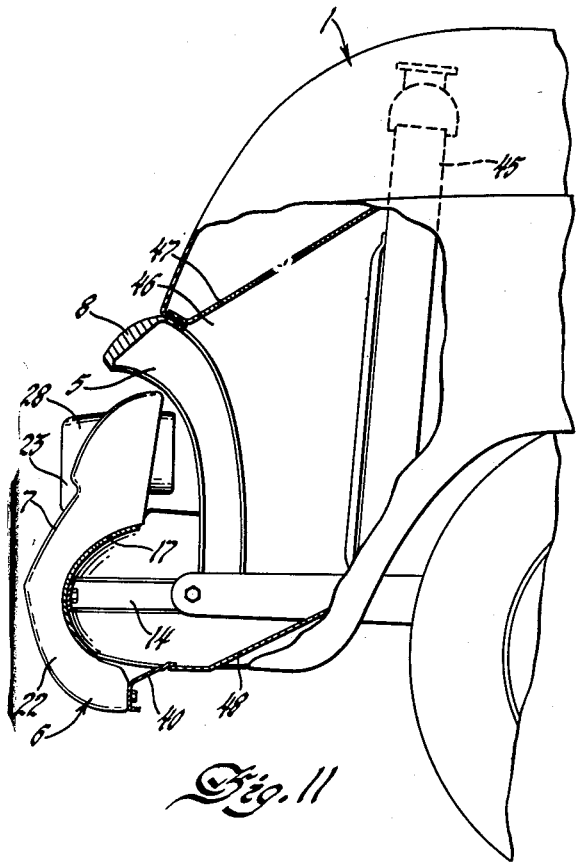

Figure 11 is a diagrammatic view, partly in elevation and partly in longitudinal section, of an automotive vehicle front end construction similar to that shown in Figures 1 and 2 but with certain parts eliminated to better show the relationship of my improved bumper-grille construction to the vehicle cooling air intake passage to the engine.

Figure 12:
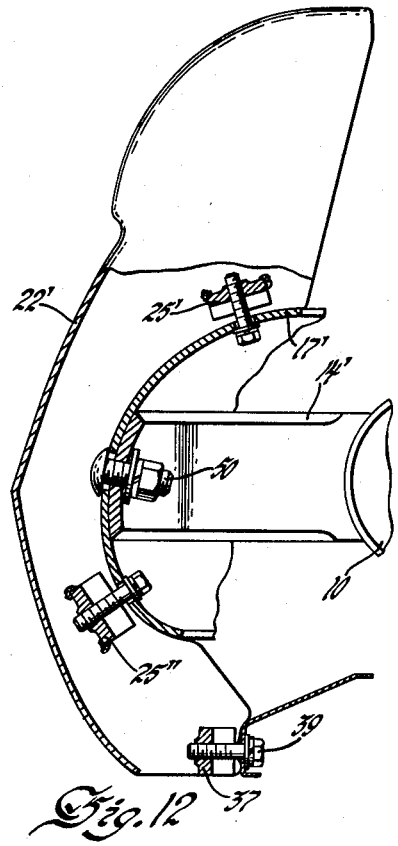
Figure 13:
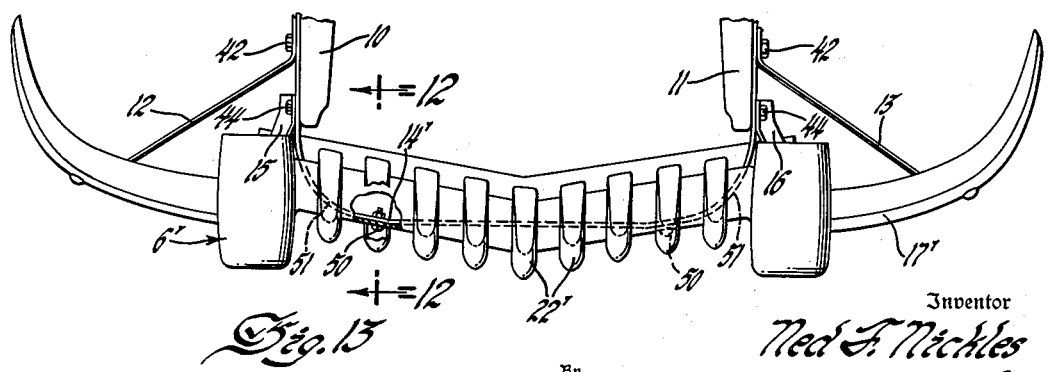

Figure 12 is a sectional view taken substantially on line 12—12 of Figure 13, showing a modified means of attaching the secondary or grille bars to the primary bumper bar.

Figure 13 is a view similar to Figure 2 but showing a modified means for suspending the bumper-grille structure from the vehicle chassis frame.

In the drawings, referring first to Figures 1–11, the numeral 1 designates generally an automotive vehicle having a forwardly mounted engine (not shown) disposed between fenders 2 and 3 and covered by a hood 4, there being an opening 5 in the forward end wall of the body for the entrance of cooling air to the engine, and a combination bumper and grille structure designated generally by the numeral 6 which is disposed transversely of the vehicle for protecting the same against collisions with other vehicles, etc. It will be noted that in accordance with conventional practice the intake air opening 5 is elongated transversely of the vehicle and that the grille portion 7 of the bumper-grille structure serves to conceal this opening. 8 is a decorative molding which frames the top and sides of opening 5, and is fixedly secured by suitable means (not shown) to the body 1.

10 and 11 represent the forward ends of the usual longitudinal sills of the vehicle frame to which the bumper-grille 6 is attached by arms 12 and 13, a U-shaped bracket 14 and arms 15 and 16. Arms 12 and 13 and bracket 14 are formed of usual spring steel strap section and extend horizontally in laterally diverging relation from the sills. Arms 15 and 16 are shown as angle section pieces inclined forwardly and downwardly from the sills and serve to increase the vertical stability afforded the bumper-grille by the arms 12 and 13 and bracket 14. Two bolts 42 and 43 are employed for anchoring the rear ends of the arms 12 and 13 and bracket 14 in horizontally extending relation to the respective sills 10 and 11, whereas the rear ends of the arms 15 and 16 are each secured to the sills by only one bolt 44 in order that arms 15 and 16 may pivot thereabout in a vertical plane to accommodate the relatively small amount of flexure of arms 12 and 13 and bracket 14 required for cushioning horizontal impacts against the bumper-grille 6.

The bumper-grille structure 6 comprises a one-piece primary impact bar 17 of C section (Figures 4 and 6), and is generally U-shaped in plan as indicated in Figure 2. Its end portions 18 and 19 serve to protect the forward end of the vehicle opposite the fenders 2 and 3, and its intermediate section 20 spans the engine cooling air opening 5 and may be offset rearwardly from the end portions 18 and 19 as shown in Figure 2 to place it substantially in the plane of the opening 5.

Attached to the intermediate portion 20 of the primary bar 17 are a series of secondary or grille bars 22, which series is flanked on each side by similar and somewhat larger secondary bars 23. Both the secondary bars 22 (Figure 4) and the secondary bars 23 (Figure 7) are generally C-shaped as viewed in side elevation to fit the front face of the primary bar 17. The secondary bars 22 are also C-shaped as viewed in horizontal section, and fixedly mounted as by welding interiorly to each thereof opposite the primary bar 17 is a threaded nut 25. Bolts 26, extending through suitable apertures in the bracket 14 and the primary bar 17, threadedly engage the nuts 25 for securing the secondary bars 22 to the primary bar 17 and the primary bar 17, in turn, to the bracket 14. The rear edges 27 of the secondary bars 22 closely conform to the front face of the primary bar 17 in order to prevent any displacement of the secondary bars 22 thereon when the bolts 26 are tightly drawn up. Arms 12 and 13 have their forward end portions abutting and bolted as at 24 (Figure 6) to the end portions 18 and 19, respectively, of the primary bar 17.

The outermost secondary bars 23 differ principally from the secondary bars 22 in that their upper ends 28 are enlarged to form generally cylindrical housings adapted to enclose vehicle head lamp assemblies indicated generally at 29, the forward ends of the housings 28 each having an opening 30 for passage of the light beam from lamp 29. Each of these secondary bars 23 is removably fastened at two places, to the primary bar 17, upper and lower threaded nuts 32 and 33 being welded to the side walls within the bars 23 to receive bolts 34 for this purpose.

The lower end of each of the secondary bars 22 has also mounted interiorly thereof a threaded nut 37 and each of the secondary bars 23 is similarly provided with a nut 38 at its lower end, these receiving bolts 39 for attaching a decorative strip 40 which complements the U-shaped decorative molding 8 to provide the appearance of a frame for the bottom of opening 5. The downwardly inclined arms 15 and 16 make their attachment to the bumper-grille also at the lower ends of the secondary bars 23, the forward ends of these arms overlying the nuts 38 and anchored thereto by the same bolts 39 which secure the opposite ends of the strip 40 as clearly illustrated in Figures 7, 8 and 10.

Referring now to Figure 11 it will be seen that my bumper-grille structure 6 is mounted substantially within the plane of the engine cooling air intake opening 5 located at the forward end of a passageway to the engine radiator 45, the walls defining this passageway being diagrammatically indicated by side panels 46, upper baffle plate 47 and lower baffle plate 48 which are attached in any desired manner to the sheet metal or frame of the vehicle 1. In this view it is seen that the decorative strip 40 carried by the bumper-grille structure 6 slightly overlaps the lower baffle plate 48 to cooperate therewith in directing air inwardly of the passage to the radiator 45.

It will thus be seen that I have provided a combined bumper and grille structure which is supported as a unit from the vehicle frame. The arms 12 and 13 and bracket 14 serve in conventional manner to cushion impacts received by the bumper-grille in directions longitudinally of the vehicle, and the lower arms 15 and 16 by reason of their vertical inclination serve to prevent the bumper-grille from vibrating in a vertical plane yet do not seriously interfere with the cushioning function of the aforesaid parts 12, 13 and 14. Further, since the grille portion 7 of my bumper-grille is made up of individually distinct secondary bars 22 and 23 which attach by bolts to the primary bar 17, both the initial cost of the assembly and the expense of its repair in the event of collision damage are considerably less than is the case with prior constructions employing but one or at most a relatively few large one-piece sections each of which normally must be replaced if damaged only in part. While a plurality of so called "bumper guards" similar to my secondary bars 22 in construction and means of attachment have been used heretofore as protection for conventional grilles, it is believed that I am the first to suggest the arrangement of a series of such elements in laterally spaced relation to combine the functions of the previously distinct grille and bumper guards.

Figures 12 and 13 represent a slightly modified manner of attaching the secondary or grille bars 22' to the primary bar 17', and of attaching the primary bar 17' to the U-shaped supporting bracket 14'. The secondary bars 22' in this modification are bolted independently to the primary bar 17', upper and lower threaded nuts 25' and 25" being fixedly provided interiorly of the bars 22' for this purpose. The attachment of the primary bar 17' to the U-shaped bracket 14' is effected only at two laterally spaced points by bolts 50.

Two advantages of this modified construction over that previously described are that the secondary bars 22' may all be assembled with the primary bar 17' as a unit prior to installation on the vehicle, and that the U-shaped bracket 14' may be given a longer radius of curvature in the sections 51 between its end portions and intermediate portion for greater flexibility in absorbing vehicle impacts.

I claim:

1. In an automotive vehicle having a frame including sheet metal members forming an engine compartment and a forwardly open duct for the passage of cooling air thereinto, a generally U-shaped decorative molding carried by the sheet metal constituting a frame for the top and sides of the duct entrance, a plurality of at least four generally vertical transversely spaced individual bumper bars terminating at their upper ends below and closely adjacent the upper portion of said molding, a transverse decorative strip carried by said vertical bars opposite the bottom of the duct entrance serving to complement the molding in framing said entrance, said strip being positioned behind said vertical bars and removably fixed to each thereof, a transverse bumper bar extending between opposite sides of the vehicle behind said vertical bars, and spring means securing said transverse bar to the vehicle frame, said vertical bars being carried by the transverse bar and removable individually therefrom.

2. A combined bumper and grille construction for an automotive vehicle having an end air intake opening framed at the top and sides by a decorative molding, comprising a single primary bar of substantially uniform vertical width having end portions adapted to protect the vehicle laterally of said opening, a series of at least four individually distinct secondary bars extending perpendicularly from the primary bar and removably fixed thereto in spaced-apart parallel relation within the lateral and upper marginal limits of said opening, and a decorative strip removably secured to the secondary bars in parallel spaced relation below the primary bar to simulate a frame for the bottom of said opening complementary of said molding.

3. A combined bumper and grille construction for an automotive vehicle having an end intake opening, comprising a single primary bar having end portions adapted to protect the vehicle laterally of said opening, a series of at least four individually distinct secondary bars perpendicularly disposed to the primary bar and removably fixed thereto in spaced-apart parallel relation within the lateral and upper margins of said opening, the two outermost secondary bars of said series each terminating at one of their ends in a head lamp housing extending substantially parallel with the normal direction of movement of the vehicle, each said housing having an opening in its end furthest disposed from the vehicle to accommodate passage of a beam of light.

4. In an automotive vehicle having a frame supporting a sheet metal structure including a vehicle end wall having an opening for entrance of cooling air, a primary bumper bar in protective relation with said end wall and of substantially uniform and narrower vertical width than that of said opening, a plurality of at least four spaced-apart secondary bars projecting into the opening from above and below the primary bar to form a grille for said opening, horizontal spring arms resiliently spacing the primary bar from the vehicle end wall, said horizontal arms being fixedly secured at their opposite ends to the primary bar and vehicle frame, and other arms arranged in vertically inclined relation with said horizontal arms and fixedly secured at their opposite ends to the vehicle frame and to one end of the secondary bars.

5. A combined bumper and grille construction for an automotive vehicle having an air intake opening in one end, comprising a single primary bar adapted to extend transversely from one side to the other of the vehicle opposite the end of the vehicle, said primary bar having a section intermediate its ends provided with a plurality of individual perpendicularly disposed secondary bars extending above and below the primary bar and removably fixed thereon transversely equi-spaced in pairs from the longitudinal center line of the vehicle, said plurality of secondary bars having surface areas spaced forward of said primary bar, the number of said bars being such as to form the primary areas of contact with foreign objects which would otherwise engage said primary bar in said intermediate section.

6. A combined bumper and grille construction for an automotive vehicle having an end air intake opening, comprising a single primary bar extending across said opening and having end portions adapted to protect the vehicle laterally of said intake opening, and a series of individually distinct secondary bars extending perpendicularly above and below the primary bar and removably fixed thereto, transversely equi-spaced in pairs from the longitudinal center line of the vehicle between said end portions to form a protective grille opposite said intake opening, said series of secondary bars having surface areas spaced forward of said primary bar, the number of said bars being such as to form the primary areas of contact with foreign objects which would otherwise engage said primary bar in said intermediate section.

References Cited in the file of this patent

UNITED STATES PATENTS

| | | |
|---|---|---|
| 2,177,968 | Weiss | Oct. 31, 1939 |
| 2,193,229 | Exner | Mar. 12, 1940 |
| 2,194,459 | Frank | Mar. 26, 1940 |
| 2,213,592 | Reyburn | Sept. 3, 1940 |
| 2,224,434 | Jandus | Dec. 10, 1940 |
| 2,245,746 | Bang | June 17, 1941 |
| 2,260,578 | Murray | Oct. 28, 1941 |
| 2,329,874 | Cadwallader et al. | Sept. 21, 1943 |
| 2,621,955 | Dykstra | Dec. 16, 1952 |

FOREIGN PATENTS

| | | |
|---|---|---|
| 623,498 | Great Britain | May 18, 1949 |